United States Patent
Park et al.

(10) Patent No.: US 10,070,163 B2
(45) Date of Patent: *Sep. 4, 2018

(54) UNINTERRUPTED PLAYBACK OF VIDEO STREAMS USING LOWER QUALITY CACHED FILES

(71) Applicant: Amazon Technologies, Inc., Seattle, WA (US)

(72) Inventors: Christopher Shingee Park, Issaquah, WA (US); Erin Matthew Brasch, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/785,992

(22) Filed: Oct. 17, 2017

(65) Prior Publication Data

US 2018/0054637 A1     Feb. 22, 2018

Related U.S. Application Data

(63) Continuation of application No. 15/044,785, filed on Feb. 16, 2016, now Pat. No. 9,819,978, which is a (Continued)

(51) Int. Cl.
*H04N 7/10* (2006.01)
*H04N 7/025* (2006.01)
(Continued)

(52) U.S. Cl.
CPC ... *H04N 21/2387* (2013.01); *G06F 17/30902* (2013.01); *H04L 67/2847* (2013.01);
(Continued)

(58) Field of Classification Search
CPC ......... H04N 21/2387; H04N 21/23439; H04N 21/2404; H04N 21/25891; H04N 21/262;
(Continued)

(56) References Cited

U.S. PATENT DOCUMENTS 5,617,347 A    4/1997  Lauritzen
6,016,520 A    1/2000  Facq et al.
(Continued)

OTHER PUBLICATIONS

U.S. Appl. No. 61/683,187 entitled "Speculative Pre-Authorization of Encrypted Data Streams" and filed Aug. 14, 2012.
(Continued)

*Primary Examiner* — Oleg Asanbayev
(74) *Attorney, Agent, or Firm* — Thomas | Horstemeyer, LLP

(57) ABSTRACT

Disclosed are various embodiments for facilitating uninterrupted playback of video streams using lower quality cached files. A video file corresponding to an entirety of a video content feature encoded at a first quality may be obtained from another client on a local network. A video stream corresponding to the video content feature encoded at a second quality higher than the first quality is then obtained. The video stream is rendered for playback on a display. In response to detecting an unavailability of the video stream at a particular time in the video content feature, the video file is rendered for playback on the display in place of the video stream and commences at the particular time in the video content feature. The video file may then be sent to yet another client on the local network.

20 Claims, 7 Drawing Sheets

Related U.S. Application Data continuation of application No. 14/662,710, filed on Mar. 19, 2015, now Pat. No. 9,326,046.

(51) Int. Cl.

| | | |
|---|---|---|
| *H04N 21/2387* | (2011.01) | |
| *H04N 21/81* | (2011.01) | |
| *H04L 29/08* | (2006.01) | |
| *H04N 21/2343* | (2011.01) | |
| *H04N 21/24* | (2011.01) | |
| *H04N 21/258* | (2011.01) | |
| *H04N 21/262* | (2011.01) | |
| *H04N 21/414* | (2011.01) | |
| *H04N 21/433* | (2011.01) | |
| *H04N 21/4402* | (2011.01) | |
| *H04N 21/442* | (2011.01) | |
| *H04N 21/458* | (2011.01) | |
| *H04N 21/45* | (2011.01) | |
| *H04N 21/61* | (2011.01) | |
| *H04N 21/63* | (2011.01) | |
| *H04N 21/647* | (2011.01) | |
| *G06F 17/30* | (2006.01) | |
| *H04N 21/845* | (2011.01) | |

(52) U.S. Cl.
CPC ... *H04N 21/23439* (2013.01); *H04N 21/2404* (2013.01); *H04N 21/25891* (2013.01); *H04N 21/262* (2013.01); *H04N 21/41407* (2013.01); *H04N 21/4331* (2013.01); *H04N 21/44029* (2013.01); *H04N 21/44209* (2013.01); *H04N 21/458* (2013.01); *H04N 21/4532* (2013.01); *H04N 21/6125* (2013.01); *H04N 21/6131* (2013.01); *H04N 21/631* (2013.01); *H04N 21/647* (2013.01); *H04N 21/6473* (2013.01); *H04N 21/64738* (2013.01); *H04N 21/8193* (2013.01); *H04N 21/8456* (2013.01)

(58) Field of Classification Search
CPC ......... H04N 21/41407; H04N 21/4331; H04N 21/44029; H04N 21/4532; H04N 21/458; H04N 21/6125; H04N 21/6131; H04N 21/631; H04N 21/647; H04N 21/6473; H04N 21/64738; H04N 21/8193; H04N 21/8456; G06F 17/30902; H04L 67/2847
See application file for complete search history.

(56) References Cited

U.S. PATENT DOCUMENTS

| | | |
|---|---|---|
| 6,571,279 B1 | 5/2003 | Herz et al. |
| 6,671,424 B1 | 12/2003 | Skoll et al. |
| 6,766,376 B2 | 7/2004 | Price |
| 7,130,890 B1 | 10/2006 | Kumar et al. |
| 7,403,618 B2 | 7/2008 | Van Rijnsoever et al. |
| 7,565,399 B1 | 7/2009 | Goel |
| 7,630,986 B1 | 12/2009 | Herz et al. |
| 7,941,092 B2 | 5/2011 | Rao |
| 8,078,096 B2 | 12/2011 | Rao |
| 8,172,557 B2 | 5/2012 | Hilger et al. |
| 8,180,276 B2 | 5/2012 | Rao |
| 8,385,813 B2 | 2/2013 | Rao |
| 8,489,673 B2 | 7/2013 | Sebastian et al. |
| 8,745,158 B2 | 6/2014 | Claman et al. |
| 8,806,142 B2 | 8/2014 | Allen et al. |
| 8,898,708 B2 | 11/2014 | Rao |
| 9,215,269 B2 | 12/2015 | Freeman, II et al. |
| 9,247,300 B2 | 1/2016 | Oddo et al. |
| 9,326,046 B1 | 4/2016 | Park et al. |
| 9,544,388 B1 | 1/2017 | Li et al. |
| 2001/0056416 A1 | 12/2001 | Garcia-Luna-Aceves |
| 2002/0069132 A1 | 6/2002 | Perkes et al. |
| 2002/0071280 A1 | 6/2002 | Stahl et al. |
| 2003/0005074 A1 | 1/2003 | Herz et al. |
| 2004/0252967 A1 | 12/2004 | Sheu et al. |
| 2006/0062363 A1 | 3/2006 | Albrett |
| 2006/0069749 A1 | 3/2006 | Herz et al. |
| 2006/0143668 A1 | 6/2006 | Du |
| 2006/0277271 A1 | 12/2006 | Morse et al. |
| 2007/0011335 A1 | 1/2007 | Burns et al. |
| 2007/0033419 A1 | 2/2007 | Kocher et al. |
| 2007/0061363 A1 | 3/2007 | Ramer et al. |
| 2007/0078993 A1 | 4/2007 | Issa |
| 2007/0100806 A1 | 5/2007 | Ramer et al. |
| 2007/0106702 A1 | 5/2007 | Alam |
| 2007/0179854 A1 | 8/2007 | Ziv et al. |
| 2007/0192352 A1 | 8/2007 | Levy |
| 2008/0095370 A1 | 4/2008 | Rose et al. |
| 2008/0119132 A1 | 5/2008 | Rao |
| 2008/0140941 A1 | 6/2008 | Dasgupta et al. |
| 2008/0201225 A1 | 8/2008 | Maharajh et al. |
| 2008/0270579 A1 | 10/2008 | Herz et al. |
| 2008/0310815 A1 | 12/2008 | He et al. |
| 2009/0046545 A1 | 2/2009 | Blinnikka |
| 2009/0055471 A1 | 2/2009 | Kozat et al. |
| 2009/0083116 A1 | 3/2009 | Svendsen |
| 2009/0181649 A1 | 7/2009 | Bull et al. |
| 2009/0254971 A1 | 10/2009 | Herz et al. |
| 2009/0287750 A1 | 11/2009 | Banavar et al. |
| 2009/0288112 A1 | 11/2009 | Kandekar et al. |
| 2009/0288131 A1 | 11/2009 | Kandekar et al. |
| 2009/0320099 A1 | 12/2009 | Rao et al. |
| 2010/0005046 A1 | 1/2010 | Segel |
| 2010/0138865 A1 | 6/2010 | Rai et al. |
| 2010/0150245 A1 | 6/2010 | Camp, Jr. et al. |
| 2010/0169502 A1 | 7/2010 | Knowlson et al. |
| 2010/0251305 A1 | 9/2010 | Kimble et al. |
| 2010/0332586 A1 | 12/2010 | Jogand-Coulomb et al. |
| 2011/0047134 A1 | 2/2011 | Zhang et al. |
| 2011/0093900 A1 | 4/2011 | Patel et al. |
| 2011/0103374 A1 | 5/2011 | Lajoie et al. |
| 2011/0107372 A1 | 5/2011 | Walter |
| 2011/0177773 A1 | 7/2011 | Rao |
| 2011/0197236 A1 | 8/2011 | Rao |
| 2011/0202383 A1 | 8/2011 | Rao |
| 2012/0042050 A1 | 2/2012 | Chen et al. |
| 2012/0149346 A1 | 6/2012 | Akhtar et al. |
| 2012/0252352 A1 | 10/2012 | Rao |
| 2013/0007239 A1 | 1/2013 | Agarwal et al. |
| 2013/0019273 A1 | 1/2013 | Ma et al. |
| 2013/0031211 A1 | 1/2013 | Johnson et al. |
| 2013/0054729 A1 | 2/2013 | Sharad et al. |
| 2013/0091582 A1 | 4/2013 | Chen et al. |
| 2013/0103911 A1 | 4/2013 | Bulut et al. |
| 2014/0052873 A1 | 2/2014 | Watson et al. |
| 2014/0059156 A1 | 2/2014 | Freeman et al. |
| 2014/0073325 A1 | 3/2014 | Karaoguz |
| 2014/0096152 A1 | 4/2014 | Ferens et al. |
| 2014/0250468 A1 | 9/2014 | Barr et al. |
| 2014/0258469 A1 | 9/2014 | Maharajh et al. |
| 2016/0277776 A1 | 9/2016 | Park et al. |
| 2017/0142219 A1 | 5/2017 | Li et al. |

OTHER PUBLICATIONS

International Searching Authority and Written Opinion dated Mar. 13, 2014 for PCT/US2013/055980 filed Aug. 21, 2013.
Canadian Patent Application CA 2,880,711 filed Aug. 21, 2013, Office Action dated Feb. 22, 2016.
European Patent Application EP13830530.5 filed Aug. 21, 2013, Extended European Search Report dated Mar. 23, 2016.
PCT Patent Application PCT/US2013/055980 filed Aug. 21, 2013, International Search Report and Written Opinion dated Mar. 13, 2014.
U.S. Appl. No. 13/592,752, filed Aug. 23, 2012, Non-Final Office Action dated Jan. 30, 2015.
U.S. Appl. No. 13/592,752, filed Aug. 23, 2012, Notice of Allowance dated Aug. 14, 2015.

(56) References Cited

OTHER PUBLICATIONS

U.S. Appl. No. 13/592,752, filed Aug 23, 2012, Response to Non-Final Office Action dated Jan. 30, 2015.
U.S. Appl. No. 14/274,121, filed Aug. 23, 2012, Non-Final Office Action dated Mar. 18, 2016.
U.S. Appl. No. 14/274,121, filed May 9, 2014, Notice of Allowance dated Sep. 1, 2016.
U.S. Appl. No. 14/274,121, filed May 9, 2014, Response to Non-Final Office Action dated Mar. 18, 2016.
U.S. Appl. No. 14/662,710, filed Mar. 19, 2015, Notice of Allowance dated Dec. 10, 2015.
U.S. Appl. No. 14/953,891, filed Nov. 30, 2015, Non-Final Office Action dated Mar. 11, 2016.
U.S. Appl. No. 14/953,891, filed Nov. 30, 2015, Notice of Allowance dated May 13, 2016.
U.S. Appl. No. 14/953,891, filed Nov. 30, 2015, Response to Non-Final Office Action dated Mar. 11, 2016.
U.S. Appl. No. 15/044,785, filed Feb. 16, 2016, Final Office Action dated Feb. 28, 2017.
U.S. Appl. No. 15/044,785, filed Feb. 16, 2016, Notice of Allowance dated Jul. 14, 2017.
U.S. Appl. No. 15/044,785, filed Feb. 16, 2016, Non-Final Office Action dated Oct. 12, 2016.
U.S. Appl. No. 15/044,785, filed Feb. 16, 2016, Response to Non-Final Office Action dated Oct. 12, 2016.
U.S. Appl. No. 15/044,785, filed Feb. 16, 2016, Response to Restriction/Election dated Jun. 24, 2016.
U.S. Appl. No. 15/044,785, filed Feb. 16, 2016, Restriction/Election dated Jun. 24, 2016.
U.S. Appl. No. 15/258,610, filed Sep. 7, 2016, Non-Final Office Action dated Mar. 3, 2017.
U.S. Appl. No. 15/258,610, filed Sep. 7, 2016, Response to Non-Final Office Action dated Mar. 3, 2017.
U.S. Appl. No. 15/399,184, filed Jan. 5, 2017, Non-Final Office Action dated Jun. 23, 2017.
U.S. Appl. No. 15/399,184, filed Jan. 5, 2017, Response to Non-Final Office Action dated Jun. 23, 2017.
U.S. Appl. No. 15/399,184, filed Jan. 5, 2017, Non-Final Office Action dated Feb. 2, 2018.

UNINTERRUPTED PLAYBACK OF VIDEO STREAMS USING LOWER QUALITY CACHED FILES

CROSS-REFERENCE TO RELATED APPLICATIONS

This application is a continuation of, and claims priority to, co-pending U.S. patent application entitled "UNINTERRUPTED PLAYBACK OF VIDEO STREAMS USING LOWER QUALITY CACHED FILES," filed on Feb. 16, 2016, and assigned application Ser. No. 15/044,785, which is a continuation of, and claims priority to, co-pending U.S. patent application entitled "UNINTERRUPTED PLAYBACK OF VIDEO STREAMS USING LOWER QUALITY CACHED FILES," filed on Mar. 19, 2015, and assigned application Ser. No. 14/662,710, which issued as U.S. Pat. No. 9,326,046 on Apr. 26, 2016, which are incorporated herein by reference in their entirety.

BACKGROUND

The advent of widely available, high-speed broadband Internet connections has also brought about video streaming services. Such services, though the use of advanced codecs, are able to offer streaming of high definition (HD) and standard definition (SD) video at bitrates that are accessible via cable modem or digital subscriber line (DSL) bandwidths at home. HD video may, for example, offer up to 1080 lines of resolution, interlaced or progressive scan. Availability of video having even higher quality is now on the horizon, with displays beginning to support 4 k and/or 8 k ultra high definition (UHD) video. Higher bandwidth Internet connections using fiber-to-the-home and/or other technologies may be required to stream UHD video.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing uninterrupted playback of high-quality video streams via caching of video files having relatively lower quality. While home-based televisions, set-top boxes and peripherals, desktop computers, and so on may have access to a consistent, high-bandwidth Internet connection, mobile devices often do not have such a luxury. Mobile devices, such as smartphones, tablets, and laptops, may at times be connected to high-speed wireless local area network (LAN) connections such as WI-FI. At other times, connectivity may be via a third-generation (3G) or fourth-generation (4G) cellular network, which may or may not be as fast as a wireless LAN. Further, connectivity may be constrained in some areas to 2G speeds, or Internet connectivity may simply be absent. Network congestion and/or bandwidth throttling may impact wireless LAN or cellular data connections. In some cases, bandwidth may be constrained due to a chosen data plan. In summary, the network connectivity available to a mobile device may be of varying data speeds.

Users frequently are interested in streaming video content such as movies and television programs to their mobile devices. However, as discussed above, the network connectivity to a mobile device may change over time. While a mobile device may have sufficient network connectivity to stream a high-quality video at one location, streaming may be impossible at another location. Sometimes the change in network connectivity may be relatively brief (e.g., due to a small cellular dead spot). If a user enters a dead spot while streaming video content via a mobile device, the playback may be interrupted.

Various embodiments of the present disclosure facilitate the uninterrupted playback of video streams through the use of low-quality video files. A low-quality video file for a video content feature may be downloaded to a mobile device, either before or after the user indicates an interest in the video content feature. The low-quality video file may be one or more orders of magnitude smaller in data size as compared to the data size of the high-quality video stream. The smaller data size both allows for storage upon a mobile device with constrained data storage resources and allows for a relatively fast download. When a high-quality video stream is interrupted, playback may instantaneously shift to the cached lower-quality version, thereby avoiding a disruption of the viewing experience.

Various techniques may be employed in determining which video content features should be predictively cached. Several approaches to predictive caching are described in U.S. patent application Ser. No. 13/592,752 entitled "PREDICTIVE CACHING FOR CONTENT" and filed on Aug. 23, 2012, and U.S. patent application Ser. No. 14/274,121 entitled "CLIENT-SIDE PREDICTIVE CACHING FOR CONTENT" and filed on May 9, 2014, which are incorporated herein by reference in their entirety.

Figure 1A:
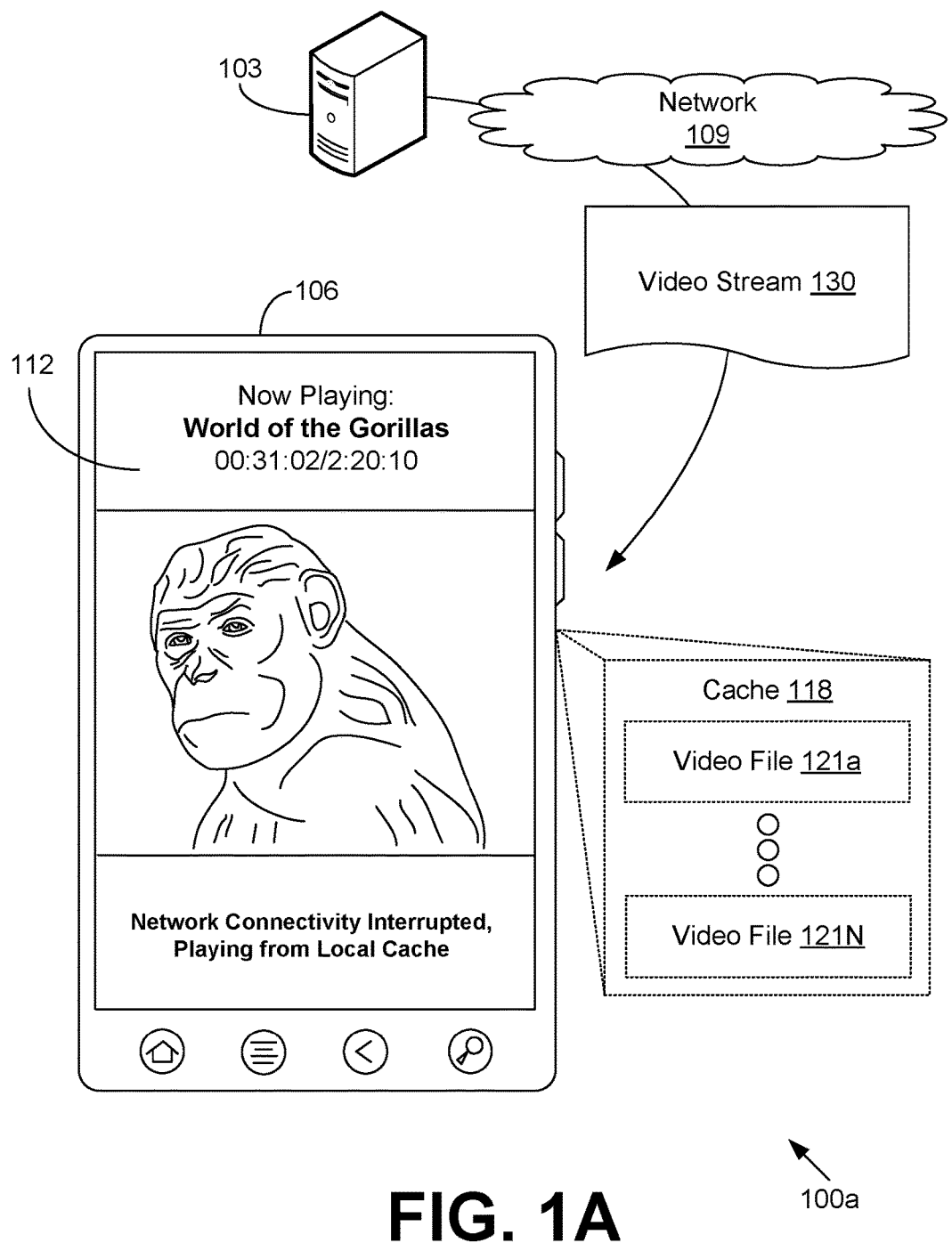
FIG. 1A is a drawing presenting one example of operation of a networked environment according to various embodiments of the present disclosure.

With reference to FIG. 1A, shown is one example of operation for a networked environment 100a according to various embodiments. The networked environment 100a includes a computing environment 103 in data communication with one or more clients 106 via a network 109. The client 106 is rendering a user interface 112 corresponding to a video player that is playing a movie titled "World of the Gorillas." The user interface 112 informs the user that network connectivity to the client 106 has been interrupted. In spite of the network connectivity interruption, playback of the movie continues nonetheless based upon a cached version of the movie that is locally available to the client 106. The movie may be cached via predictive caching.

The client 106 includes a cache 118 in memory that stores a plurality of video files 121a . . . 121N corresponding to each predictively cached video content feature. Through predictive caching, the client 106 is configured to obtain the video files 121 from the computing environment 103 over the network 109 before the user at the client 106 requests use or playback of the content item. Further, the client 106 may initialize various software and/or hardware components based at least in part on the video files 121 in order to provide a seamless experience when the client 106 switches playback to the video files 121.

After the user requests to play a video content feature, the client 106 may then obtain a video stream 130 over the network 109 from the computing environment 103. The video stream 130 may correspond to a much higher quality video as compared to the video files 121, and the video stream 130 may have a much higher bitrate as compared to the video files 121. The difference may be an order of magnitude in comparison or even greater. When the high-quality video stream 130 becomes unavailable, the client 106 may seamlessly continue playback via a corresponding low-quality video file 121. In the following discussion, a general description of the system and its components is provided, followed by a discussion of the operation of the same.

Figure 1B:
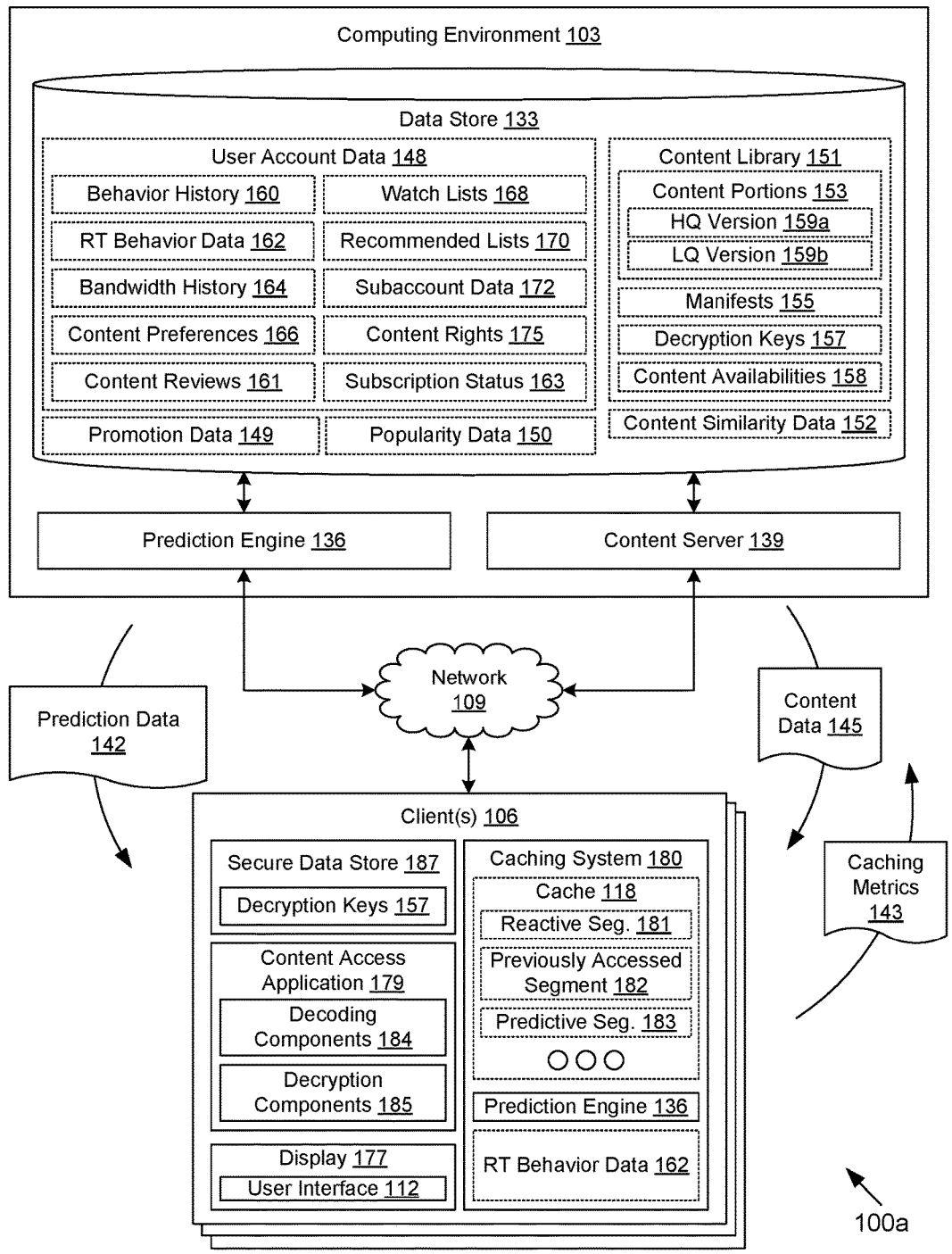
FIG. 1B is a drawing presenting a detailed view of the networked environment of FIG. 1A according to various embodiments of the present disclosure.

Turning now to FIG. 1B, shown is a detailed view of the networked environment 100a according to various embodiments. The networked environment 100a includes the computing environment 103 in data communication with one or more clients 106 via the network 109. The network 109 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 103 may comprise, for example, a server computer or any other system providing computing capability. Alternatively, the computing environment 103 may employ a plurality of computing devices that may be employed that are arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, a content delivery network, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 133 that is accessible to the computing environment 103. The data store 133 may be representative of a plurality of data stores 133 as can be appreciated. The data stored in the data store 133, for example, is associated with the operation of the various applications and/or functional entities described below.

The components executed in the computing environment 103, for example, include a prediction engine 136, a content server 139, and other applications, services, processes, systems, engines, or functionality not discussed in detail herein. The prediction engine 136 is executed to generate a list of content that a user is predicted to use. To this end, the prediction engine 136 may analyze various behavioral data collected regarding the user along with other data. The list of content corresponds to content that the user is likely to playback or consume. The list may include relative priorities for the content corresponding to a relative strength of prediction. The list may be sent to the client 106 over the network 109 as prediction data 142.

In one embodiment, the prediction engine 136 may be configured to receive various caching metrics 143 reported by the clients 106. The caching metrics 143 may indicate a proportion of playback occurrences for which a video file 121 was cached and used. In some cases, the cache metrics 143 may include additional metadata that indicates why particular content items were selected to be cached, e.g., which cache segment cached the particular content item. The sizes of the cache segments may also be reported, as well as how long it takes to cache specific content items. The caching metrics 143 may be employed as feedback to the prediction engine 136 in order to improve future predictions according to machine learning techniques.

The content server 139 is executed to serve up video content features and associated data to users of clients 106. To this end, the content server 139 is configured to send content data 145 to the client 106 via the network 109. The content data 145 may include both video streams 130 and video files 121. In addition, the content server 139 may generate and send user interface data to the client 106 to facilitate user browsing, searching, and/or selection of content. Such user interface data may correspond to web page data, mobile application data, and/or other forms of user. Such user interface data may include hypertext markup language (HTML), extensible markup language (XML), cascading style sheets (CSS), and/or other data. In one embodiment, the content server 139 may send directives to the client 106 that instruct the client 106 to predictively cache preselected video files 121.

The data stored in the data store 133 includes, for example, user account data 148, promotion data 149, popularity data 150, a content library 151, content similarity data 152, and potentially other data. The content library 151 includes data relating to content items that are made available by the content server 139 for playback, download, viewing, lease, purchase, etc. Such content items may include, for example, movies, television shows, music, music videos, video clips, audio clips, applications such as mobile applications, and so on. The content library 151 may include content portions 153, metadata such as manifests 155 and decryption keys 157, content availabilities 158, and/or other data.

Each of the content portions 153 may correspond to a distinct time segment of the particular content item. In some cases, multiple alternative content portions 153 may be provided for time segments, e.g., both English and Spanish language audio tracks, different bitrates with different encoding qualities, and so on. The content portions 153 may include Moving Pictures Experts Group (MPEG) video data, high efficiency video coding (HEVC) data, H.264 data, Flash® media data, MPEG layer 3 (MP3) audio data, Dolby Digital® audio data, Advanced Audio Coding (AAC) audio data, data for subtitles, etc. The content portions 153 may include a high-quality version 159a that will be used for the video stream 130, a low-quality version 159b that will be used for the video file 121 that is predictively cached, and possibly other versions.

The manifests 155 may describe, for example, how a particular content item is made up of various content portions 153. The manifest 155 may include identifiers for content portions 153 that make up the content item along with sequence-specifying data so that the client 106 can obtain and render the content portions 153 in the correct order. The manifest 155 may also identify various alternative content portions 153 for a content item such as, for example, alternative languages, alternative bitrates, and other alternatives. In some cases, the manifest 155 may provide license-related information, including the location of the decryption keys 157.

The decryption keys 157 may be employed by the client 106 to decrypt content portions 153 which are encrypted under digital rights management (DRM) technologies. A decryption key 157 may be sent along with the content portions 153 if the client 106 has rights to the corresponding content item. The rights to the corresponding content item may expire at a particular time, after a time period, upon a certain number of plays for the content item, or at some other time. Thus, the decryption keys 157 may be configured to expire in response to expiration of the rights of the client 106 to the corresponding content item. In some embodiments, the decryption keys 157 may be referred to as "licenses" for the corresponding content items.

The content availabilities 158 may indicate dates or times at which the content becomes available and/or unavailable. The content availabilities 158 may be generally applicable or may apply to certain classes of users, classes of consumption (e.g., purchase or rental), or classes of subscriptions. Once content is made available, in some cases, the content may later be made unavailable. For example, content may be made available for free for users having a certain membership status beginning with a starting date. However, the content may be dropped from the promotion after an expiration date. The content availabilities 158 may be used to indicate new releases, expiring releases, and/or other classes of content, which may, in some cases, be of particular interest to users so as to result in adding content to a cache 118 when the content meets certain availability criteria. For example, a first user may express a particular interest in new releases within the past month, while a second user may express a particular interest in content that is to expire from a membership program within the next week.

The promotion data 149 may indicate which content is actively being promoted within a content access application, a network site, or other venue where content is promoted. Whether content is promoted may factor in whether the content is selected to be predictively cached. For example, content that is heavily promoted via a gateway page of a network site may be more likely to be selected by a user. In some scenarios, the promotions may be associated with a discount or other incentive that may lead the user to select the content for use.

The popularity data 150 may indicate the relative popularity of content according to various categorizations. For example, the popularity data 150 may indicate relative popularity of content with respect to all content, relative popularity of content within a specific genre, relative popularity of content among certain demographics or classifications of users, and so on. A user may be more likely to use popular content as compared to unpopular content, thus popularity may factor into determining whether to predictively cache content items.

The content similarity data 152 may indicate which content is similar to other content. In one embodiment, the content similarity data 152 may be generated by a collaborative filtering approach based upon consumption of content by a pool of users or other data sets. Users may be more likely to consume content that is similar to content they have previously consumed or in which they otherwise indicated an interest.

The user account data 148 may include various data associated with user accounts with the content server 139. Such accounts may be explicitly registered and configured by users or may be created implicitly based on client interaction with the content server 139. The user account data 148 may include, for example, behavior history 160, content reviews 161, real-time behavior data 162, subscription status 163, bandwidth history 164, content preferences 166, watch lists 168, recommended lists 170, subaccount data 172, content rights 175, and other data. In addition, security credentials, contact information, payment instruments, and/or other user-related data may be stored in the user account data 148.

The behavior history 160 describes historical behavior of the user associated with the user account. Such behavior may include a content consumption history describing which content items the user has viewed, downloaded, rented, purchased, etc. In one example, the content consumption history corresponds to a media consumption history indicating which media content items the user has viewed, downloaded, rented, purchased, etc. Such behavior may also include a browse history tracking network pages or content the user has previously accessed, a search history tracking previous search queries, subscription history, purchase and browse history for non-content items, and/or other forms of online behavior. As a non-limiting example, a user who views a trailer for a movie, as recorded in the behavior history 160, may be more likely to view the movie soon afterward.

The real-time behavior data 162 may include data describing what the user is currently doing, e.g., what content the user is currently browsing, what search queries the user is currently executing, what search results are being displayed to the user, etc. The real-time behavior data 162 may be observed by the content server 139 or collected from reports by the client 106. For example, the client 106 may be configured to report to the content server 139 that the user is hovering a cursor over a description of a certain content item in a user interface. In some embodiments, the real-time behavior data 162 may be maintained in the client 106 rather than the computing environment 103.

The bandwidth history 164 profiles the network bandwidth available for the user through the client 106. The bandwidth history 164 may be employed to select from among multiple bitrates of content items automatically for predictive caching. If the user employs multiple clients 106, multiple profiles may be created in the bandwidth history 164. Also, multiple location-dependent profiles may be created for clients 106 that are mobile devices. As a non-limiting example, a user may have third-generation (3G) cellular data access at an office location, but high-speed Wi-Fi data access at a home location, thereby resulting in multiple location-dependent bandwidth profiles for the same client 106 in the bandwidth history 164.

The content preferences 166 include various preferences inferred from user behavior or explicitly configured by users. Such preferences may be related to media content quality (e.g., bitrate, codec, etc.), language preferences, subtitle preferences, closed captioning preferences, supplemental content preferences (e.g., relating to directors' or actors' commentaries, etc.), parental control preferences, and so on. The watch lists 168 may correspond to lists of content items in which users have explicitly indicated that they desire to consume the content at some time in the future. The recommended lists 170 correspond to lists of content items generated for each user by the prediction engine 136.

The subaccount data 172 may be employed to describe preferences or behaviors that differ across multiple users of a user account. For instance, a family may have a single user account but subaccounts for each member of the family. Each user may explicitly log in to a subaccount, or the subaccount may be inferred based on time of day, day of the week, identity or type of the client 106, location of the client 106, and/or other factors. In some cases, one user may be associated with multiple subaccounts. Further, a subaccount may be associated with multiple users. The subaccount data 172 may specify restrictions on content access in some cases. As a non-limiting example, a subaccount for a child may be limited to access only child-friendly content from approved sources. In some cases, different subaccounts may be associated with different clients 106.

The content rights 175 may describe the rights to content which are associated with the user account. For example, a user may have a subscription to certain content or all content available through the content server 139. Such a subscription may be for indefinite use, time-limited use, device-limited use, and/or other licensing arrangements. Alternatively, a user may purchase or lease content on a per-content-item basis. The subscription status 163 may indicate that status of the user with respect to content subscriptions, program memberships, promotions, and/or other statuses that may entitle the user to access certain content or access certain content for no additional charge or an otherwise reduced fee.

The content reviews 161 may correspond to user-created ratings and/or reviews of content. For example, the content preferences 166 of a user may be inferred based upon the types of content that he or she writes favorable or unfavorable reviews upon. When a user rates content from a certain genre negatively, he or she may be considered less likely to select content from that genre in the future. However, in some cases, when a user frequently writes reviews or enters ratings for a certain genre, it may be inferred that the user is likely to select content from that genre, regardless of whether the user liked or disliked the content.

The client 106 is representative of a plurality of client devices that may be coupled to the network 109. The client 106 may comprise, for example, a processor-based system such as a computer system. Such a computer system may be embodied in the form of desktop computers, laptop computers, personal digital assistants, cellular telephones, smartphones, set-top boxes, music players, web pads, tablet computer systems, game consoles, electronic book readers, or other devices with like capability. The client 106 may include a display 177. The display 177 may comprise, for example, one or more devices such as liquid crystal display (LCD) displays, electrophoretic ink (E ink) displays, gas plasma-based flat panel displays, organic light emitting diode (OLED) displays, LCD projectors, or other types of display devices, etc.

The client 106 may be configured to execute various applications such as a content access application 179, a caching system 180, and/or other applications. The content access application 179 may be executed in the client 106, for example, to access and render content items from the computing environment 103 and/or other servers. Moreover, the content access application 179 may access various other network content served up by the computing environment 103 and/or other servers, thereby rendering a user interface 112 on the display 177. The content access application 179 may function as a video player application and may provide various video player functionality including, for example, initiating playback, stopping playback, pausing playback, adjusting volume, setting preferences, browsing for media content, searching for media content, recommending media content by rendering recommendations, and so on. In one embodiment, the content access application 179 comprises a browser application.

The caching system 180 is executed to predict various content items that the user is likely to access and to cache video files 121 (FIG. 1A) in the cache 118 to facilitate instantaneous use. The cache 118 may be maintained using a plurality of cache segments. In one embodiment, the cache 118 is structured to have a reactive segment 181, a previously accessed segment 182, a predictive segment 183, and/or other cache segments. The cache segments may utilize different content selection criteria, as discussed below. The different cache segments may also utilize different cache eviction/purging criteria. In some scenarios, cache segments may be tied to particular storage devices. For example, one cache segment may be on one storage device, while another cache segment may be on another storage device. In one embodiment, the caching system 180 receives caching instructions from the computing environment 103 and is configured to carry out the caching instructions. In various embodiments, the prediction engine 136 or portions thereof may be implemented client-side within the caching system 180.

The reactive segment 181 may include content that is immediately selectable for use or playback via a current user interface 112 rendered by the content access application 179. For example, the current user interface 112 may have buttons, drop-down boxes, links, and/or other user interface components that, when selected, initiate usage or playback of a particular content item. In some cases, content may be selected for the reactive segment 181 when selectable via a predetermined number of actions by way of the current user interface 112. For example, the reactive segment 181 may include all content that is selectable via the current user interface 112 and any user interface 112 directly reachable via the current user interface 112. It is understood that different user interface 112 screens and portions thereof may be associated with different reactive caching policies. For example, the proportion of titles reactively cached on a search page may differ from the proportion of titles reactively cached on a program season detail page. A feedback loop may be employed to improve the hit rate of titles cached in the reactive segment 181 over time with respect to the behavior of users.

The previously accessed segment 182 may include content that the user has previously used. For example, where the content is a video, the user may have watched the video in its entirety or may have paused or stopped the video at some point before the end. Where the user has paused or stopped the video, the user may likely return at some later time to resume the video. Similarly, even if the user has watched the video in its entirety, the user may return later and review it. Such behavior may be user dependent; i.e., some users may be more likely to review or resume content, while others may more likely abandon content. In one scenario, where the user has paused or stopped the content at a position other than at the beginning, the previously accessed segment 182 may include a portion of the video file 121 that commences with the position where the content has been paused or stopped.

The predictive segment 183 may include content that the user is predicted to access based upon a variety of data sources. For example, the caching system 180 may prefetch content corresponding to that specified in the prediction data 142. The predictive segment 183 may be filled based upon resource availability and priority of the content specified in the prediction data 142. As non-limiting examples, the content in the predictive segment 183 may be selected based at least in part on user account data 148 associated with the user, promotion data 149, popularity data 150, content availabilities 158, content similarity data 152, and/or other data.

In various scenarios, the cache segments of the cache 118 may have fixed or dynamic relative maximum sizes. The sizes may be established based at least in part on the number of content items (e.g., titles), disk space consumed for the respective content items, user preferences, user behavior (e.g., for some users a larger reactive cache may be preferred, and so on), and/or other factors. In one scenario, the predictive segment 183 may be larger than the previously accessed segment 182, which may in turn be larger than the reactive segment 181. However, due to update frequencies, the contents of the reactive segment 181 may be updated more frequently than, for example, the predictive segment 183.

The content access application 179 may include various decoding components 184 and decryption components 185 corresponding to logic that facilitates usage or playback of content items. The caching system 180 may also initialize various decoding components 184, decryption components 185, etc. for content items in the cache 118. In this regard, various objects may be instantiated in the memory of the client 106 for the decoding components 184 and the decryption components 185. The overall size of the cache 118 may depend, for example, on user-configured parameters, the available data storage in the client 106, the bandwidth available to the client 106 over the network 109, or on other factors. In various embodiments, the client 106 may be configured to make predictive caching decisions and/or the computing environment 103 may be configured to make predictive caching decisions.

The client 106 may also include a secure data store 187 for storage of decryption keys 157 used in decrypting content items to which the user has rights in the client 106. The secure data store 187 may comply with various rules regarding security for storage of DRM licenses. The secure data store 187 may have relatively limited storage space for decryption keys 157. In some cases, the limited storage space in the secure data store 187 may in turn limit the size of the cache 118. The caching system 180 may be configured to install the decryption keys 157 in the secure data store 187 which the corresponding content items are predictively cached. The client 106 may be configured to execute applications beyond the content access application 179 and the caching system 180 such as, for example, browsers, mobile applications, email applications, social networking applications, and/or other applications.

Next, a general description of the operation of the various components of the networked environment 100a is provided. To begin, users may register and interact with the content server 139 such that behavior history 160 (e.g., consumption history, etc.), bandwidth history 164, content preferences 166, watch lists 168, and/or other data in the user account data 148 is created for a content access account.

As users interact with the content server 139, the popularity data 150 and the content similarity data 152 may be generated. In some cases, the popularity data 150 and the content similarity data 152 may be obtained from other sources. Users may add content to their watch lists 168 and write reviews for the content reviews 161. Administrators may configure various promotions in the promotion data 149.

The recommended lists 170 and/or other data indicating content that the user is likely to select may be sent to the client 106 as prediction data 142. From a list of recommended content items, the caching system 180 may select a subset of the list based at least in part on a respective priority of the content items, an available data storage for the client 106, available storage in the secure data store 187, available bandwidth, power state in the client 106, costs associated with the network 109 connection to the client 106, type of network 109 connection to the client 106, configuration parameters, and/or other factors. In addition, the caching system 180 may determine content items to be cached in the reactive segment 181, the previously accessed segment 182, and/or other cache segments. In one embodiment, the caching system 180 determines the selected subset according to a directive from the computing environment 103.

As non-limiting examples, a content item may be selected for caching based at least in part on a subscription status 163 of the user and whether a discounted price for the content item is available for the user given the subscription status 163, whether the content item will become unavailable to the user within a predetermined time period according to the content rights 175 and the content availabilities 158, whether the content item is recommended to the user via a user interface 112 of a content access application 179, and/or other factors.

The caching system 180 proceeds to predictively cache the content items in the selected subset. In doing so, the caching system 180 may obtain the video files 121 via the content portions 153 corresponding to the low-quality version 159b before the user selects any of the corresponding video content features for playback. To this end, the caching system 180 may obtain the low-quality version 159b content portions 153 and metadata such as manifests 155 and decryption keys 157 from the content server 139.

The content portions 153 may be sent in an encrypted format. To handle this, the caching system 180 may obtain decryption keys 157, which are then installed in the secure data store 187 to handle the decryption. The caching system 180 may spin up and initialize hardware and/or software resources of the client 106, to include, for example, decoding components 184, decryption components 185, and other components of the content access application 179. Hardware resources such as displays 117 may be configured. Thus, the caching system 180 may perform some processing relative to the metadata and/or the initial portion of the content item in order to prepare the client 106 for playback of the predictively cached content items prior to the user explicitly indicating that use or playback is desired.

Seamless failover playback may then be provided by the content access application 179 when any of the selected subset of content items is selected for use or playback by the user. The content access application 179 is configured to stream a selected video content feature corresponding to high-quality version 159a content portions 153 from the content server 139 as a video stream 130. Although described as a seamless failover, it is understood that such playback may include a fade transition or other transition.

It is understood that the systems of the client 106 described herein may be employed with a second screen experience. For example, multiple displays 177 may be utilized, with one display 177 rendering a control user interface 112 for the content access application 179 and another display 177 rendering the actual content. The displays 177 may correspond to the same client 106 or multiple clients 106 that are in data communication.

Figure 1C:
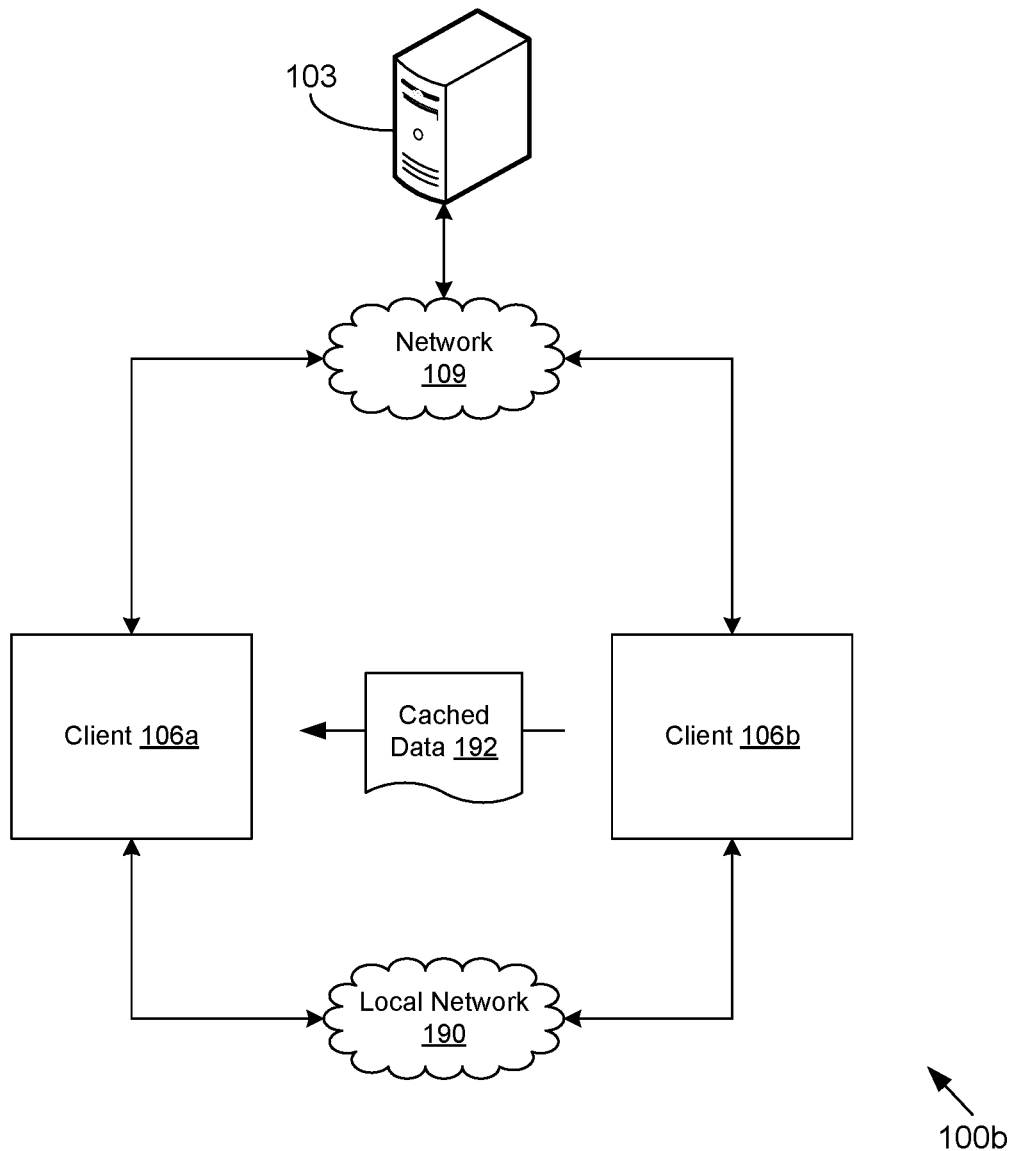
FIG. 1C is a drawing presenting a view of a networked environment that facilitates local cached file exchange according to various embodiments of the present disclosure.

Moving on to FIG. 1C, shown is a drawing presenting a view of a networked environment 100b that facilitates local cached file exchange. The networked environment 100b includes the computing environment 103, a client 106a, and a client 106b in data communication via the network 109. Although two clients 106 are shown, it is understood that the two clients 106 are representative of any plurality of clients 106. Additionally, the clients 106a and 106b may be in data communication via a local network 190. The local network 190 may comprise an Ethernet network, a Wi-Fi® network, a Multimedia over Coax Alliance (MoCA) network, a Bluetooth® network, a Home Phoneline Networking Alliance (HomePNA®) network, and/or other networks that offer relatively unconstrained bandwidth between local devices.

In the networked environment 100b, the client 106a is able to obtain cached data 192 from the client 106b directly via the local network 190 without having to go through the potentially congested network 109 to obtain the data from the computing environment 103. That is to say, the caching system 180 (FIG. 1B) on the client 106a is able to obtain the cached data 192 from a cache 118 (FIG. 1B) maintained by the client 106b. In this regard, the client 106a is able to determine that the cached data 192 that is needed is stored by the client 106b either by communicating directly with the client 106b or by communicating with the computing environment 103. Discovery-type broadcast messaging may be sent across the local network 190 so that each client 106 is aware of the state of the other caches 118 existing in clients 106 upon the local network 190. The cached data 192 may comprise video files 121 (FIG. 1A) and/or other data.

Figure 2:
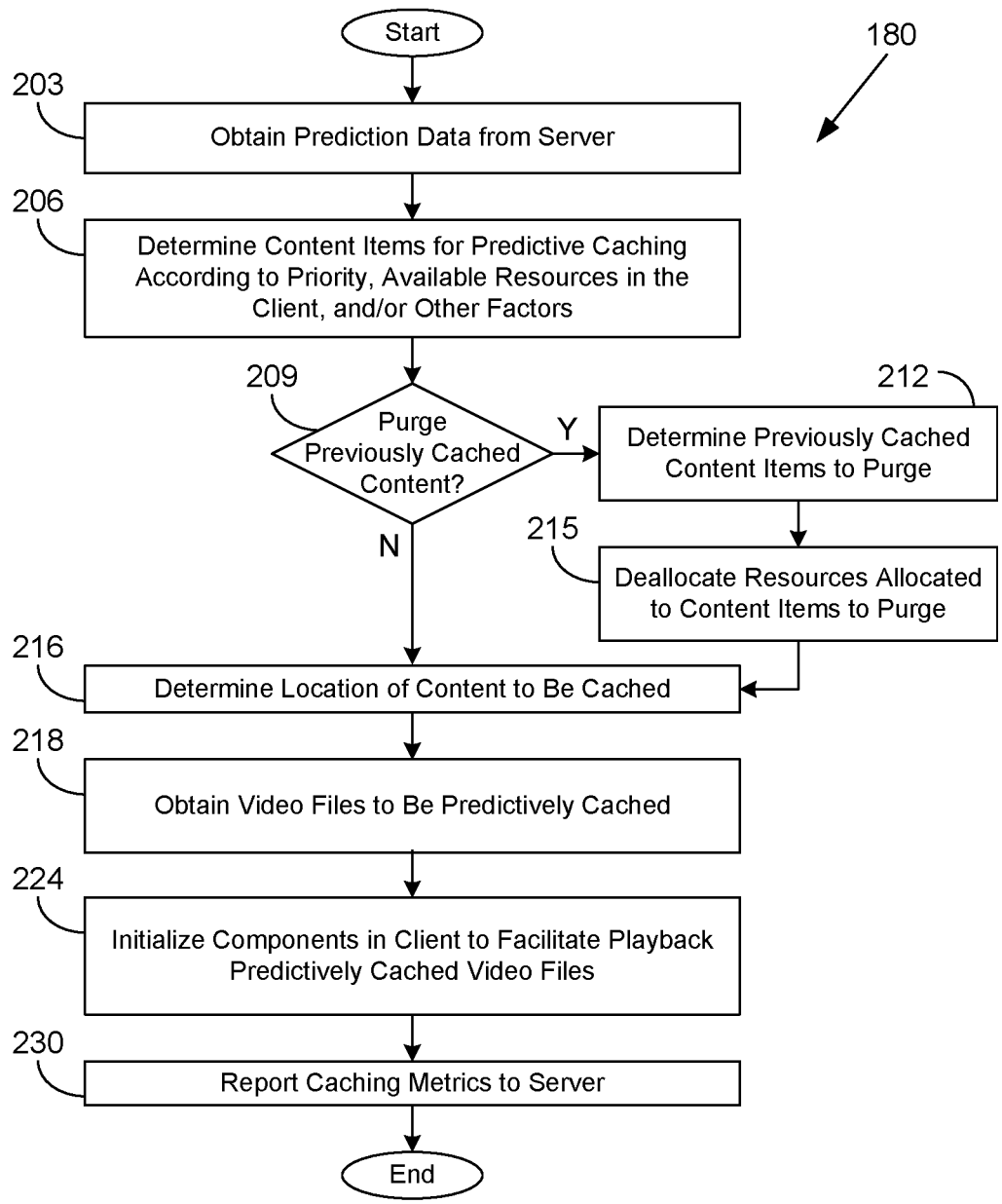
FIG. 2 is a flowchart illustrating one example of functionality implemented as portions of a caching system executed in a client in the networked environment of FIG. 1B according to various embodiments of the present disclosure.

Referring next to FIG. 2, shown is a flowchart that provides one example of the operation of a portion of the caching system 180 according to various embodiments. It is understood that the flowchart of FIG. 2 provides merely an example of the many different types of functional arrangements that may be employed to implement the operation of the portion of the caching system 180 as described herein. As an alternative, the flowchart of FIG. 2 may be viewed as depicting an example method implemented in the client 106 (FIGS. 1A & 1B) according to one or more embodiments.

Beginning with box 203, the caching system 180 may obtain prediction data 142 (FIG. 1B) from the computing environment 103 (FIG. 1B). The prediction data 142 may indicate a list of content items that the user is at the client 106 is predicted to access. Such prediction data 142 may be generated based at least in part on, for example, behavior history 160 (FIG. 1B) including content consumption history, content preferences 166 (FIG. 1B), real-time behavior data 162 (FIG. 1B), and/or other data. The list of recommended content items may have a priority associated with each content item in the list. Such a priority may indicate a relative likelihood that the user will want to consume the particular content item.

In box 206, the caching system 180 determines content items for predictive caching. Indications of the content items may be added to a queue for caching in association with respective priorities. Subsequently, the indications of the content items may be selected from the queue for caching to be implemented. The selection may be driven by priority of the respective content items, available resources in the client 106 (e.g., available memory or data storage allocated for the cache 118 (FIGS. 1A & 1B), available storage in the secure data store 187 (FIG. 1B), available bandwidth on the network 109 (FIGS. 1A & 1B) for the client 106, bandwidth history 164 (FIG. 1B), content preferences 166 (FIG. 1B), real-time behavior data 162 available to the client 106, configuration parameters, and/or other factors. Where the cache 118 is segmented, the different selection criteria for the segments and the respective capacities of the segments may be considered.

In box 209, the caching system 180 determines whether previously cached content from the cache 118 is to be purged. Such content may be purged in order to free up resources for other content that is determined to be more likely to be consumed by the user. The previously cached content may also be rendered obsolete by a change to the factors which prompted its initial selection to be predictively cached, e.g., if the content is no longer timely, if the real-time behavior of the user that prompted the predictive caching of the content has changed, if the user has completed consuming the content, and so on. In some cases, the user may explicitly request that content be purged from the cache 118. In some cases, the caching system 180 may be able to resize a target cache segment to accommodate the content item selected for predictive caching.

If previously cached content is to be purged, the caching system 180 moves from box 209 to box 212 and determines which of the previously cached content items are to be purged. In some cases, the user may explicitly identify which content is to be purged. In box 215, the caching system 180 deallocates resources in the client 106 that had been allocated to the content items that are to be purged. In doing so, the caching system 180 may, for example, remove video files 121 (FIG. 1A) from the cache 118, remove unnecessary decryption keys 157 (FIG. 1B) from the secure data store 187, terminate unnecessary decoding components 184 (FIG. 1B) or decryption components 185 (FIG. 1B), and so on. The caching system 180 then proceeds to box 216. If the caching system 180 instead decides not to purge previously cached content, the caching system 180 moves from box 209 to box 216.

In box 216, the caching system 180 determines the location of the content to be cached. In some instances, the video files 121 and/or other data for the content to be cached may be cached by another client 106 upon the local network 190 (FIG. 1C). In other instances, the caching system 180 may have to retrieve the data from the computing environment 103. Existing cached content accessible via the local network 190 may be preferred to minimize data usage for the network 109 and/or to improve caching performance.

In box 218, the caching system 180 obtains content portions 153 (FIG. 1B) corresponding to a low-quality version 159b (FIG. 1A) from the content server 139 (FIG. 1B) for the video files 121 that are to be predictively cached. The initial portions may correspond to the beginning of the content item, a location where the user left off in consuming the content item, a popular location within the content item, and/or other starting portions within the content item. The caching system 180 may also obtain manifests 155 (FIG. 1B), decryption keys 157, and/or other metadata. In box 224, the caching system 180 may initialize various components in the client 106 to facilitate playback of the predictively cached video files 121. This may include, for example, launching and/or initializing decoding components 184 and/ or decryption components 185, storing decryption keys 157 in the secure data store 187, and/or performing other tasks. In box 230, the caching system 180 may report caching metrics 143 (FIG. 1B) to the computing environment 103. Thereafter, the portion of the caching system 180 ends.

Figure 3:
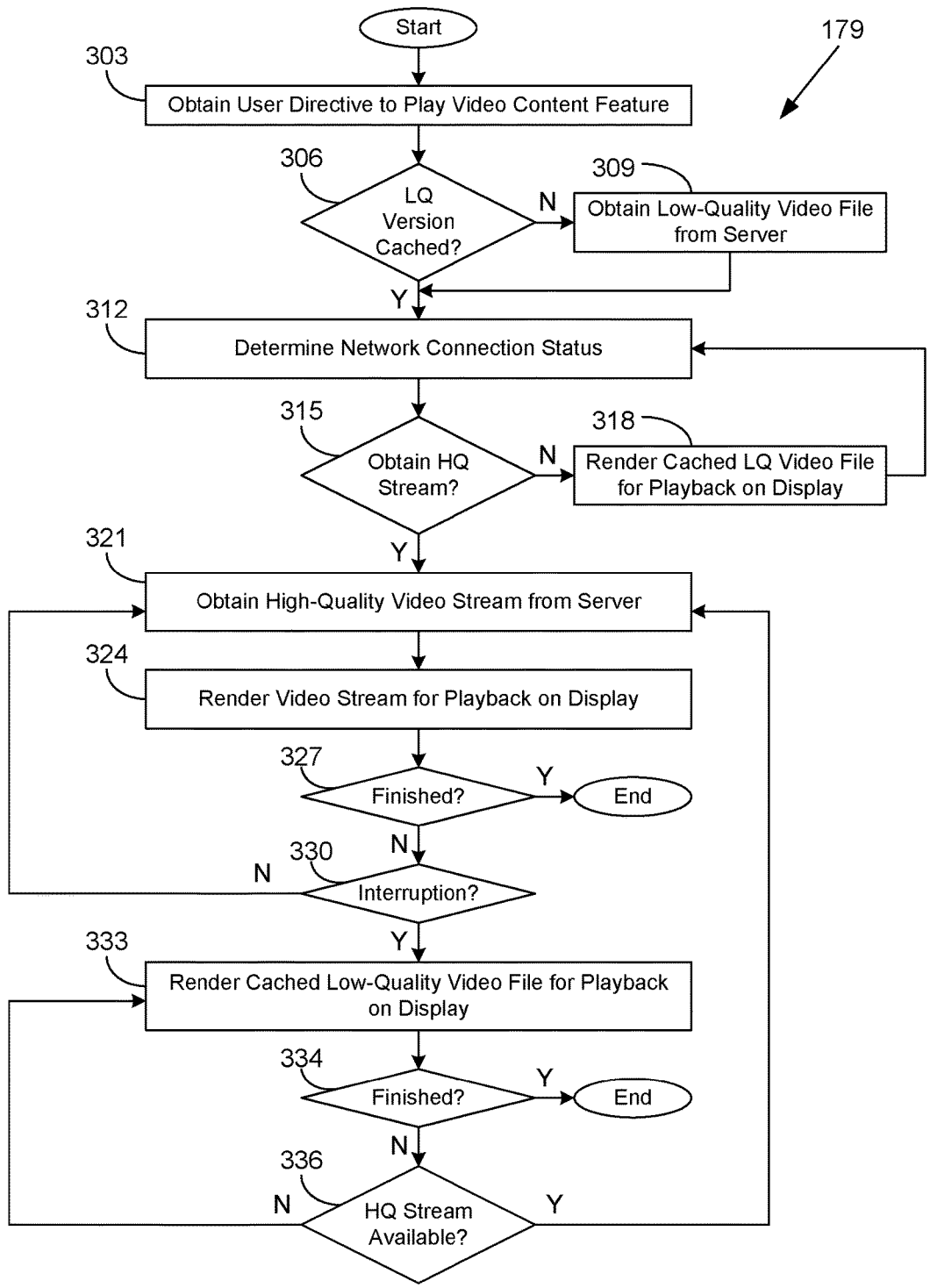
FIG. 3 is a flowchart illustrating one example of functionality implemented as portions of a content access application executed in a client in the networked environment of FIG. 1B according to various embodiments of the present disclosure.

Turning now to FIG. 3, shown is a flowchart that provides one example of the operation of a portion of the content access application 179 according to various embodiments. It is understood that the flowchart of FIG. 3 provides merely an example of the many different types of functional arrangements that may be employed to implement the operation of the portion of the content access application 179 as described herein. As an alternative, the flowchart of FIG. 3 may be viewed as depicting an example method implemented in the client 106 (FIGS. 1A & 1B) according to one or more embodiments.

Beginning with box 303, the content access application 179 obtains a user directive to play a video content feature. For instance, a user may navigate to a user interface 112 (FIGS. 1A & 1B) that presents a content item, and the user may select a "play" button or other similar user interface component. In box 306, the content access application 179 determines whether the video file 121 (FIG. 1A) corresponding to the low-quality version 159*b* (FIG. 1A) has been predictively cached in the client 106. If the content item has not been predictively cached in the client 106, or if the predictive caching is incomplete, the content access application 179 may continue to box 309.

In box 309, the content access application 179 may obtain the low-quality video file 121 from the content server 139 (FIG. 1B). Alternatively, if available, the content access application 179 may obtain the video file 121 from another client 106 coupled to a local network 190 (FIG. 1C). In addition to obtaining the video file 121, manifests 155 (FIG. 1B), decryption keys 157 (FIG. 1B), and/or other metadata may be obtained and various components in the client 106 may be initialized. This may include, for example, launching and/or initializing decoding components 184 (FIG. 1B) and/or decryption components 185 (FIG. 1B), storing decryption keys 157 (FIG. 1B) in the secure data store 187, and/or performing other tasks. The content access application 179 then continues to box 312. If the video file 121 has been predictively cached, the content access application 179 transitions from box 306 to box 312.

In box 312, the content access application 179 may determine the network connection status for the client 106. For example, the client 106 may be entirely disconnected from the network 109 (FIG. 1B), connected to a cellular network, connected to a wireless local area network, or have some other connection arrangement. The content access application 179 may probe the connection to determine available bandwidth to the content server 139. The content access application 179 may also determine a type of device, e.g., a type of mobile device, to which the client 106 corresponds, and/or a cost associated with data transfer to the client 106.

In box 315, the content access application 179 determines whether to obtain the video stream 130 (FIG. 1B) from the content server 139, corresponding to a high-quality version 159*a* (FIG. 1B) of the video content feature. Such a determination may be based at least in part on the network connection status, including the available cost, type of network connection, bandwidth, and/or other factors. In some cases, a user may enable an offline mode setting to force the content access application 179 to use cached data. If the content access application 179 is not to obtain the video stream 130 at this time, the content access application 179 proceeds to box 318 and commences rendering of the cached low-quality video file 121 for playback on the display 177 (FIG. 1B). The content access application 179 then returns to box 312 and again determines the network connection status for the client 106.

If the content access application 179 instead determines that the video stream 130 is to be obtained, the content access application 179 progresses from box 315 to box 321. In box 321, the content access application 179 obtains the high-quality video stream 130 from the content server 139 over the network 109. In box 324, the content access application 179 renders the video stream 130 for playback on the display 177. In box 327, the content access application 179 determines whether playback of the video content feature has finished. If playback has finished, the operation of the portion of the content access application 179 ends. Otherwise, the content access application 179 continues to box 330 and determines whether playback of the video content feature has been interrupted. For example, the content access application 179 may assess the network connection status as in box 312, determine that the video stream 130 is not available, or that the availability of the video stream 130 is associated with an unacceptable cost. If no interruption occurs, the content access application 179 returns to box 321 and continues obtaining and rendering the high-quality video stream 130.

If an interruption occurs, the content access application 179 moves to box 333 and renders the cached low-quality video file 121 for playback on the display 177. If the playback of the video stream 130 left off at a particular time in the video content feature, the playback of the low-quality video file 121 may automatically commence at the particular time in the video content feature, thereby providing a seamless playback experience. In box 334, the content access application 179 determines whether playback of the video content feature has finished. If playback has finished, the operation of the portion of the content access application 179 ends. Otherwise, in box 336, the content access application 179 determines whether the high-quality video stream 130 has again become available. For example, the content access application 179 may assess the network connection status as in box 312, determine that the video stream 130 is again available, or determine that the availability of the video stream 130 is associated with an acceptable cost.

If the video stream 130 is not available, the content access application 179 returns to box 333 and continues rendering the video file 121 for playback on the display 177. If the video stream 130 is again available, the content access application 179 returns to box 321 and obtains and renders the video stream 130. The playback of the video stream 130 may commence at a later time in the video content feature, where the playback of the video file 121 ends at the later time, again providing for a seamless transition from cached to streamed sources.

Figure 4:
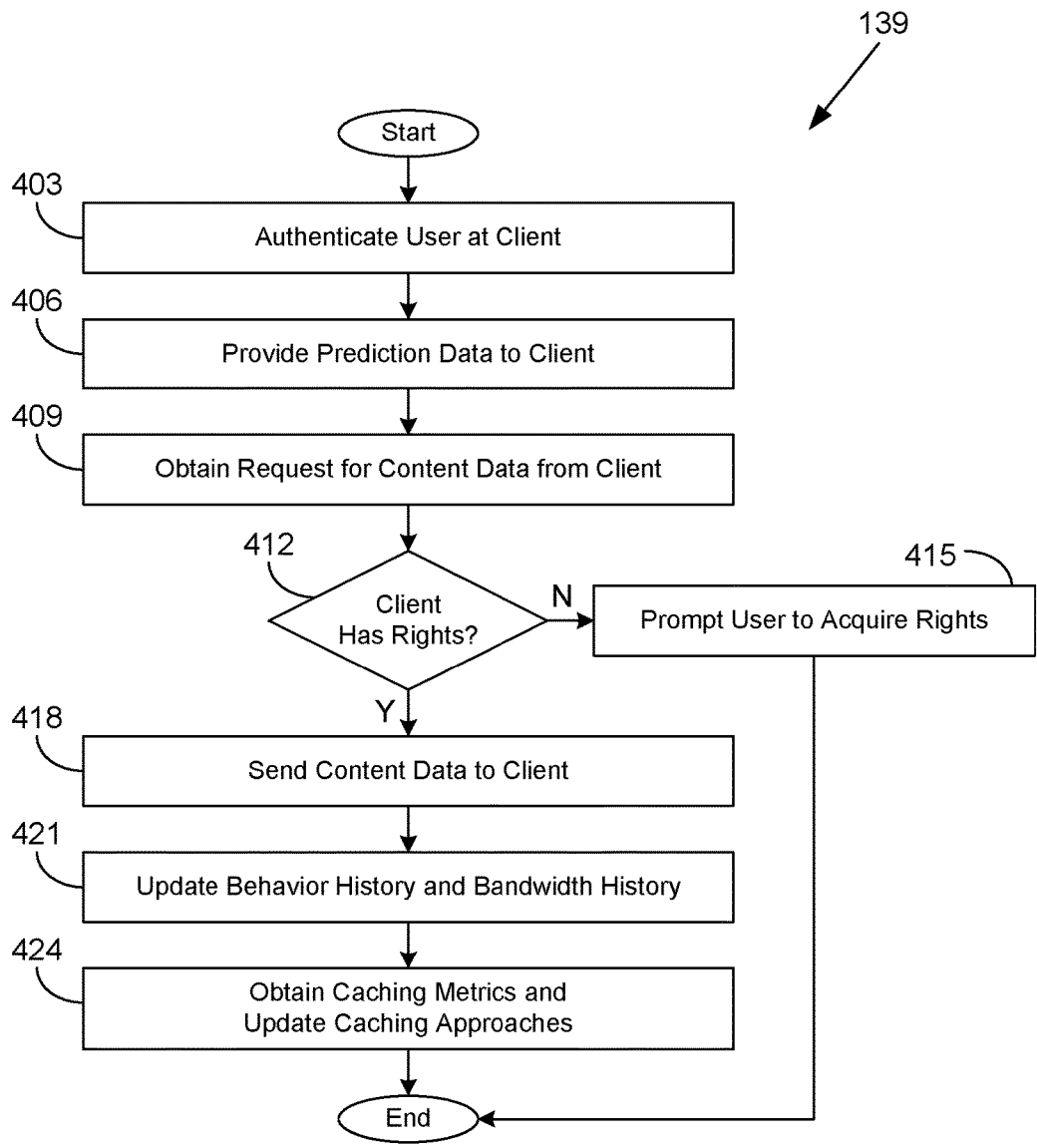
FIG. 4 is a flowchart illustrating one example of functionality implemented as portions of a content server executed in a computing environment in the networked environment of FIG. 1B according to various embodiments of the present disclosure.

Moving on to FIG. 4, shown is a flowchart that provides one example of the operation of a portion of the content server 139 (FIGS. 1A & 1B) according to various embodiments. It is understood that the flowchart of FIG. 4 provides merely an example of the many different types of functional arrangements that may be employed to implement the operation of the portion of the content server 139 as described herein. As an alternative, the flowchart of FIG. 4 may be viewed as depicting an example method implemented in the computing environment 103 (FIGS. 1A & 1B) according to one or more embodiments.

Beginning with box 403, the content server 139 authenticates a user at a client 106 (FIGS. 1A & 1B). In some cases, the user may be associated with a subaccount. The authentication may be performed by a cookie, by a username/password combination, and/or by another security credential. In box 406, the content server 139 provides prediction data 142 (FIG. 1B) to the client 106. In some cases, the content server 139 may provide directives to the client 106 to predictively cache low-quality versions 159b (FIG. 1B) of certain content items. In box 409, the content server 139 obtains a request for content data 145 (FIG. 1B) from the client 106. The request may be for content portions 153 (FIG. 1B), manifests 155 (FIG. 1B), decryption keys 157 (FIG. 1B), and/or other content data 145.

In box 412, the content server 139 determines whether the client 106 has rights to the content item to which the content data 145 pertains. If not, the content server 139 may prompt the user to acquire the rights in box 415. For example, the content server 139 may send data encoding a user interface 112 (FIGS. 1A & 1B) to the client 106, where the user interface 112 prompts the user to purchase the content item or a subscription. Thereafter, the portion of the content server 139 ends. In some cases, the encrypted content portions 153 and manifests 155 may be sent to the client 106 without the decryption key 157 if the client 106 does not have the rights.

If the client 106 does have the rights, the content server 139 moves from box 412 to box 418 and sends the content data 145 to the client 106 over the network 109 (FIGS. 1A & 1B). In some cases, the content server 139 may select from multiple bitrates for the content portions 153, multiple languages in the content portions 153, and/or other alternatives based on data such as bandwidth history 164 (FIG. 1B), content preferences 166 (FIG. 1B), etc. The bitrate may be adaptive based at least in part on the currently available bandwidth for the client 106. In box 421, the content server 139 updates the behavior history 160 (FIG. 1B), the bandwidth history 164 (FIG. 1B), and/or other data. In box 424, the content server 139 may obtain caching metrics 143 (FIG. 1B) from the client 106. The content server 139 may then record the caching metrics 143, which may then be used to improve the operation of the caching system 180 (FIG. 1B) and/or the prediction engine 136 (FIG. 1B). Thereafter, the portion of the content server 139 ends.

Figure 5:
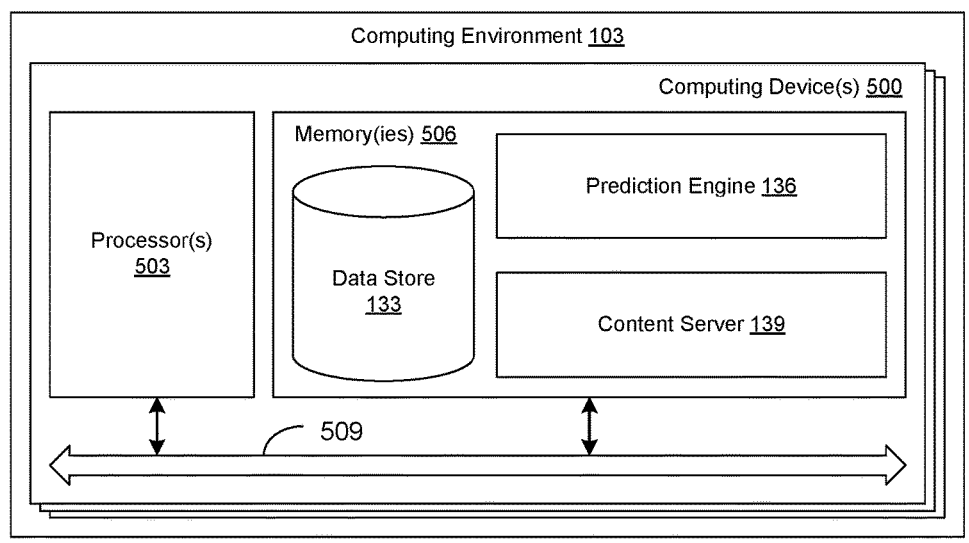
FIG. 5 is a schematic block diagram that provides one example illustration of a computing environment employed in the networked environment of FIGS. 1A-1C according to various embodiments of the present disclosure.

With reference to FIG. 5, shown is a schematic block diagram of the computing environment 103 according to an embodiment of the present disclosure. The computing environment 103 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the prediction engine 136, the content server 139, and potentially other applications. Also stored in the memory 506 may be a data store 133 and other data. In addition, an operating system may be stored in the memory 506 and executable by the processor 503. The client 106 (FIGS. 1A & 1B) may correspond to a similar computing device 500 having a processor 503 and memory 506.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the prediction engine 136, the content server 139, the content access application 179 (FIG. 1B), the caching system 180 (FIG. 1B), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2-4 show the functionality and operation of an implementation of portions of the caching system 180, the content access application 179, and the content server 139. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 2-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the prediction engine 136, the content server 139, the content access application 179, and the caching system 180, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the prediction engine 136, the content server 139, the content access application 179, and the caching system 180, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method, comprising:
   receiving, by at least one computing device, a user directive to play a video content feature;
   obtaining, by the at least one computing device, a video stream corresponding to the video content feature in response to the user directive, the video stream being encoded at a first bitrate;
   obtaining, by the at least one computing device, at least a portion of a video file from another computing device on a local network, the video file corresponding to the video content feature encoded at a second bitrate that is lower than the first bitrate;
   detecting, by the at least one computing device, that an offline mode has been enabled;
   rendering for display, by the at least one computing device, the video file in place of the video stream in response to the offline mode being enabled;
   detecting, by the at least one computing device, that the offline mode has been disabled; and
   rendering for display, by the at least one computing device, the video stream in place of the video file in response to the offline mode being disabled.

2. The method of claim 1, further comprising receiving, by the at least one computing device, a broadcast message from the other computing device via the local network, the broadcast message indicating that the video file is cached by the other computing device.

3. The method of claim 1, wherein the at least a portion of the video file is obtained from the other computing device before the user directive to play the video content feature is received.

4. The method of claim 1, further comprising:
detecting, by the at least one computing device, an interruption in the video stream at a time of interruption in the video content feature;
rendering for display, by the at least one computing device, the video file in place of the video stream commencing at the time of interruption in response to detecting the interruption; and
resuming rendering, by the at least one computing device, of the video stream in place of the video file when the video stream becomes available.

5. The method of claim 1, further comprising:
detecting, by the at least one computing device, that availability of the video stream is associated with an unacceptable cost;
rendering for display, by the at least one computing device, the video file in place of the video stream in response to detecting that the availability of the video stream is associated with the unacceptable cost; and
resuming rendering, by the at least one computing device, of the video stream in place of the video file when availability of the video stream is associated with an acceptable cost.

6. The method of claim 1, further comprising sending, by the at least one computing device, the video file to a client computing device on the local network.

7. The method of claim 1, wherein the video file corresponds to an entirety of the video content feature.

8. A method, comprising:
obtaining, by a first client computing device, a video file corresponding to a video content feature, the video file being encoded using a first bitrate;
receiving, by the first client computing device, a user directive to play the video feature after the video file is received;
obtaining, by the first client computing device, a video stream corresponding to the video feature in response to the user directive, the video stream being encoded at a second bitrate that is greater than the first bitrate;
determining, by the first client computing device, that an offline mode is enabled;
rendering for display, by the first client computing device, the video file in place of the video stream in response to the offline mode being enabled;
determining, by the first client computing device, that the offline mode has been disabled;
rendering for display, by the first client computing device, the video stream in place of the video file in response to the offline mode being disabled; and
sending, by the first client computing device, the video file to a second client computing device via a local network.

9. The method of claim 8, further comprising initializing one or more components of the first client computing device to facilitate playback of the video file before receiving the user directive.

10. The method of claim 9, wherein initializing the one or more components further comprises initializing a decoding component to decode the video file.

11. The method of claim 9, wherein initializing the one or more components further comprises initializing a decryption component to decrypt the video file.

12. The method of claim 8, further comprising sending a broadcast message via the local network, the broadcast message indicating that the video file is cached by the first client computing device.

13. The method of claim 8, wherein the video file is obtained by the first client computing device from a third client computing device via the local network.

14. The method of claim 8, further comprising purging, by the first client computing device, the video file from a local cache.

15. A system, comprising:
a first client computing device; and
at least one application executable in the first client computing device, wherein when executed the at least one application causes the first client computing device to at least:
obtain a video file via a local network from a second client computing device that has predictively cached the video file, the video file corresponding to a video content feature, the video file being encoded using a first bitrate;
receive a user directive to play the video feature after the video file is received;
obtain a video stream corresponding to the video feature in response to the user directive, the video stream being encoded at a second bitrate that is greater than the first bitrate;
determine that an offline mode has been enabled;
render for display the video file in place of the video stream in response to the offline mode being enabled
determine that the offline mode has been disabled; and
render for display video stream in place of the video file in response to the offline mode being disabled.

16. The system of claim 15, wherein when executed the at least one application further causes the first client computing device to at least send the video file to a third client computing device via the local network.

17. The system of claim 15, wherein when executed the at least one application further causes the first client computing device to at least send a broadcast message via the local network after obtaining the video file, the broadcast message indicating that the video file is cached by the first client computing device.

18. The system of claim 15, wherein when executed the at least one application further causes the first client computing device to at least receive a broadcast message via the local network, the broadcast message indicating that the video file is cached by the second client computing device.

19. The system of claim 15, wherein the video file corresponds to an entirety of the video content feature.

20. The system of claim 15, wherein when executed the at least one application further causes the first client computing device to at least, before the user directive is received, initialize a decryption component to decrypt the video file and initialize a decoding component to decode the video file.

* * * * *